United States Patent [19]

Sjoquist et al.

[11] Patent Number: 5,311,162
[45] Date of Patent: May 10, 1994

[54] SOLENOID DEVICE

[75] Inventors: Dennis R. Sjoquist, Yorba Linda; John A. Borger, Glendora, both of Calif.

[73] Assignee: Evolutionary Concepts, Inc., Pomona, Calif.

[21] Appl. No.: 61,438

[22] Filed: May 14, 1993

[51] Int. Cl.$^5$ .......................... H01F 7/08; F16K 31/06
[52] U.S. Cl. .............................. 335/260; 251/129.15; 336/205; 335/278
[58] Field of Search ................. 335/260, 278; 336/205, 336/96; 251/129.15

[56] References Cited

U.S. PATENT DOCUMENTS 3,262,027  7/1966  Zaleske et al. ................. 251/129.15

Primary Examiner—Harold Broome
Attorney, Agent, or Firm—Boniard I. Brown

[57] ABSTRACT

A solenoid for a solenoid actuator or solenoid valve is encapsulated within a unitary homogenous plastic body which is molded directly about the solenoid coil and the adjacent portion of the solenoid leads so as to seal the coil and leads against the ambient environment and includes a first body portion enclosing and sealing the coil, and an integral second body portion in the form of an externally threaded stem circumferentially surrounding and sealing the adjacent portion of the leads. The externally threaded stem may be used to couple the solenoid to an electrical cable through which the solenoid is energized or to mount the solenoid on a support, such as a barrier wall between a hostile environment to which the sealed solenoid may be safely exposed, and an environment to which the unencapsulated portions of the solenoid leads may be safely exposed.

15 Claims, 2 Drawing Sheets

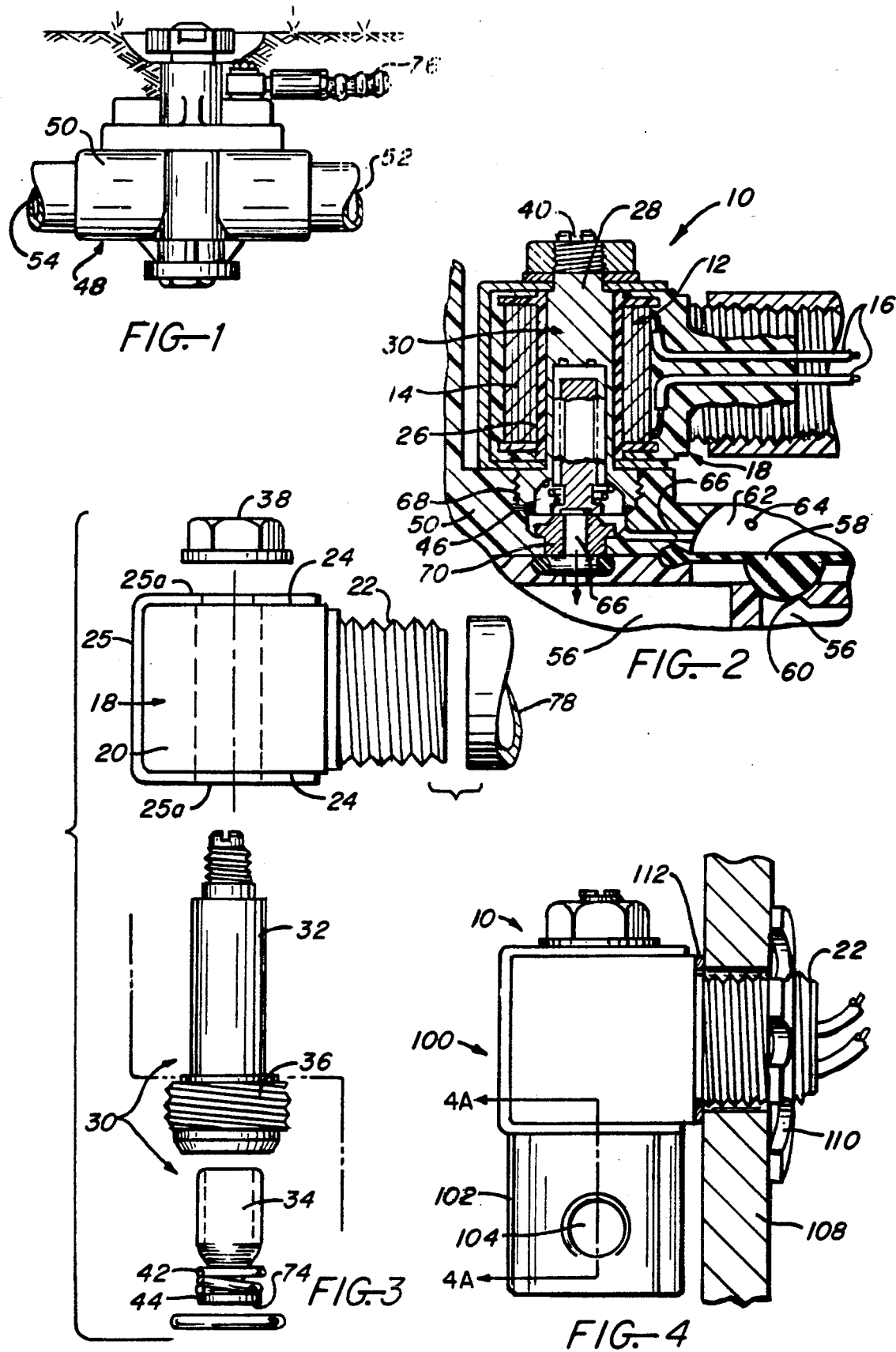

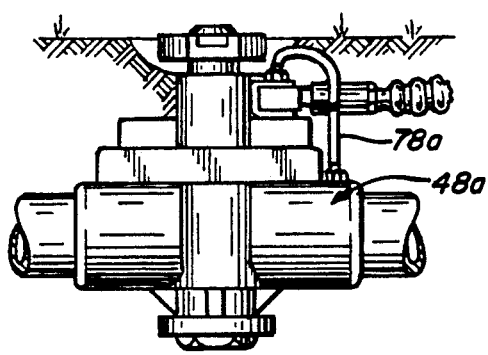
FIG.—5
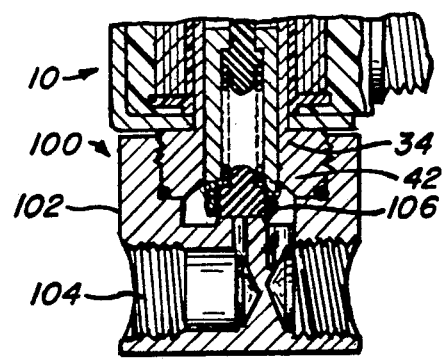
FIG.—4A
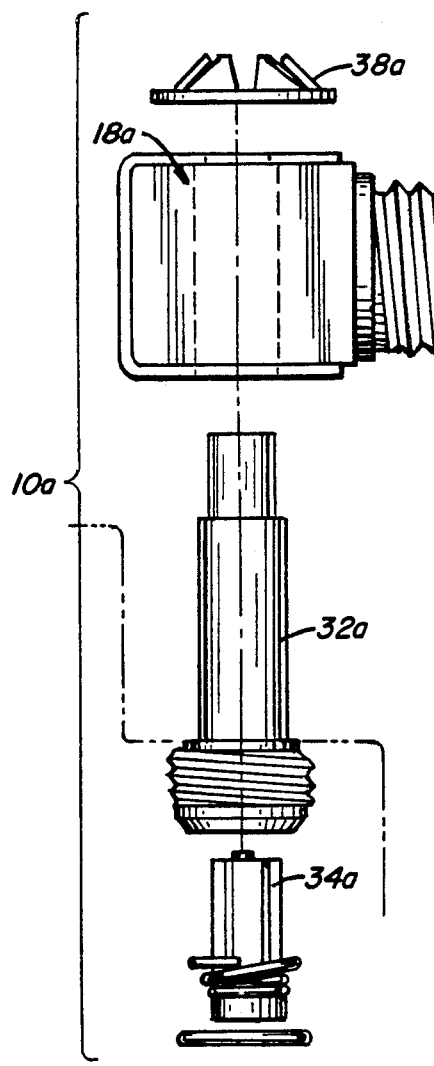
FIG.—7
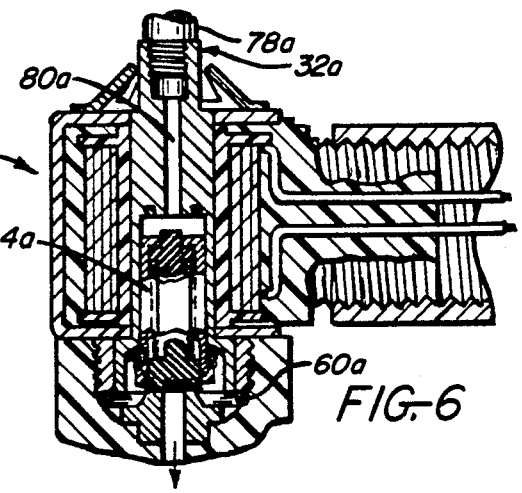
FIG.—6
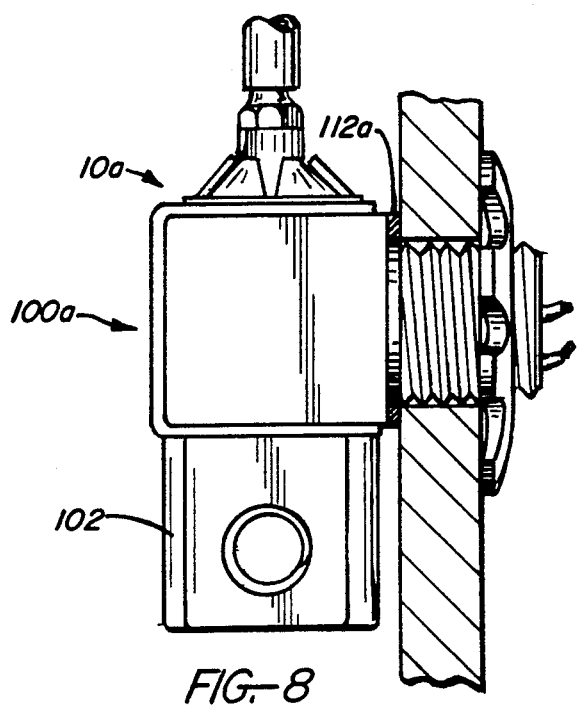
FIG.—8

SOLENOID DEVICE

BACKGROUND OF THE INVENTION

1. Field of the Invention

This invention relates generally to electrically operated devices and more particularly to an improved solenoid device which may assume the form of a solenoid actuator or solenoid valve.

2. Prior Art

Simply stated, a solenoid device comprises an electrical coil which, when energized, produces an electromagnetic field that is utilized to perform some function. In the case of a solenoid actuator, the electromagnetic field is utilized to move a magnetic armature. A solenoid valve is essentially a solenoid actuator for controlling fluid flow.

U.S. Pat. No. 4,603,832 discloses a solenoid valve. The solenoid valve illustrated and described in the patent is a pilot valve for actuating a primary pilot controlled valve. This primary valve has a valve diaphragm which is movable into and from contact with a valve seat to control fluid flow through a flow passage in the primary valve. One side of the diaphragm is exposed to the fluid pressure in the valve passage. The other side of the diaphragm is exposed to the fluid pressure in a pilot chamber which is in constant communication with the primary valve passage upstream of the diaphragm valve seat. The chamber communicates with the primary valve flow passage downstream of the valve seat through the solenoid pilot valve. Closure of the solenoid pilot valve equalizes the fluid pressures across the valve diaphragm and creates an unbalanced fluid pressure force across the diaphragm which closes the diaphragm to block flow through the primary valve. Opening of the solenoid pilot valve bleeds fluid from the pilot chamber to reduce the pressure in this chamber and effect opening of valve diaphragm by the inlet fluid pressure.

The solenoid valve described in the above patent has one deficiency which is encountered if the solenoid coil fails, as can happen, and must be replaced. This deficiency resides in the fact that the valve comprises an assembly of relatively costly parts in addition to the solenoid coil, including a magnetic yoke for the coil and an inner armature assembly, which are permanently joined to one another. As a consequence, replacement of a failed solenoid coil requires replacement of the entire, relatively costly solenoid valve assembly.

This deficiency of the patented valve is alleviated to some extent in another known solenoid valve. In this latter known valve, the solenoid coil is removable from the inner armature assembly so that the armature assembly need not be replaced with the coil. However, the replaceable part of the solenoid valve includes, in addition to the coil, a magnetic yoke for the coil and a separately formed outer can or housing which includes an internally threaded female mounting coupling for the valve and is filled with an epoxy encapsulating both the coil and yoke. Accordingly, the replaceable part of this known valve includes the solenoid coil, the can and its female coupling, and the magnetic yoke, and is thus relatively costly.

Another deficiency of at least many existing solenoid devices of the character described resides in the fact that they are difficult to mount in the way which is the most desirable or convenient for a particular application. For example, it is often desirable or neccessary to mount a solenoid valve on a wall with the solenoid located at one side of the wall and the solenoid leads extending to the opposite side of the wall. With conventional solenoid valves this presents not only the problem of attaching the solenoid to the wall but also the additional problem of providing a hole in wall through which the solenoid leads may pass to the opposite side of the wall. These problems are compounded if the wall forms a barrier between a hostile environment, against which the solenoid coil and armature are sealed, but not the solenoid leads, and a non-hostile environment. Many of the existing solenoid valves and other solenoid devices are not well adapted for or are totally incapable of use in these situations.

Accordingly, there is a need for an improved solenoid valve which if free of the above and other deficiencies of the existing solenoid valves. As will become evident from the ensuing description, this same need exists with respect to other types of solenoid devices, such as solenoid actuators, which are subject to at least some of the same deficiencies.

SUMMARY OF THE INVENTION

This invention provides such an improved solenoid device. The improved solenoid device includes a coil, a pair of electrical leads connected to the coil, and a unitary homogeneous body of solidified plastic material encapsulating the coil and a portion of the leads. This plastic body includes a first body portion of the plastic material encapsulating and sealed to the coil and a second body portion of the plastic material integral with the first body portion and encapsulating and sealed to the leads between the first body portion and a position spaced from the free ends of the leads. The first portion of the plastic body may have any convenient shape. In the preferred embodiment, this body portion has a generally block or cube shape including two parallel sides located at the ends of solenoid coil transverse to the axis of the coil. The second body portion comprises an externally threaded, male mounting stem having an outer end. The leads of the solenoid coil extend axially through and beyond the outer end of this stem, and have free end portions extending beyond said outer end of the stem for connection to an electrical energy source for energizing the coil.

A primary feature of the invention resides in the fact that the plastic body of the solenoid device is molded in one piece directly about the solenoid coil and leads. As a consequence, the plastic body is solid in cross-section from its outer surfaces to the solenoid coil and leads, and the plastic material of the body is sealed to the coil and leads. Except for the exposed free end portions of its leads, the solenoid device is totally sealed and fluid tight and totally immune to any hostile environment which will not attact the plastic material of the body. An electrical device which is sealed in this way is sometimes referred to as being "hard wired", after the coupling and armored cable are installed.

An important advantage of the improved solenoid device resides in the fact that the integrally molded male mounting stem permits mounting of the device on a barrier wall between a hostile environment in which the sealed plastic body portion of the device may be situated and a safe environment for the exposed portions of the solenoid leads. Thus, the stem may be inserted through a hole in the barrier from the hostile side of the barrier so that the exposed portions of the solenoid leads are located at the safe side of the barrier. A nut or the like is threaded on the stem at the safe side of the barrier and tightened against the barrier to firmly secure the device to the barrier. The stem may be sealed in any convenient way to barrier to prevent leakage of the hostile medium to the safe side of the barrier.

The preferred solenoid devices described herein are solenoid actuators in the form of solenoid valves each having an armature assembly removably positioned within a hole extending through the plastic body and axially through the solenoid coil and opening through the sides of the body at the ends of the coil. This armature assembly includes a sleeve extending axially through the hole and having an open end projecting beyond the adjacent side of the plastic body and circumferentially surrounded by an externally threaded shoulder for securing the sleeve to a valve housing. Within the open end of the sleeve is a magnetic armature in the form of a valve member which is movable into and from contact with a valve seat to control fluid flow through the seat in response to energizing and deenergizing of the solenoid coil.

The plastic body and encapsulated solenoid coil of the valve form an inexpensive replaceable coil part which is releasably secured to the sleeve of the armature assembly and is readily removable from the armature sleeve for replacement by a new coil part. In certain embodiments, this coil replacement is accomplished without altering the flow controlled by the solenoid.

The preferred solenoid valves have a generally U-shaped magnetic yoke removably straddling the plastic body of the replaceable coil part endwise of the solenoid coil. The yoke has arms which extend across the body sides at the ends of the coil and serves as an external magnetic flux path for the coil. The yoke is removable from the replaceable coil part when the latter is replaced by a new coil part to permit reuse of the yoke on the new part.

BRIEF DESCRIPTION OF THE DRAWINGS

FIG. 1 illustrates a pilot controlled primary valve including an improved solenoid pilot valve according to this invention for controlling the primary valve;

FIG. 2 is an enlarged axial section through the solenoid pilot valve and adjacent portions of the primary valve in FIG. 1;

FIG. 3 is an enlarged exploded view of the solenoid pilot valve in FIGS. 1 and 2;

FIG. 4 illustrates a modified solenoid valve according to the invention mounted on a wall;

FIG. 4A is a section taken on line 4A—4A in FIG. 4;

FIG. 5 is a view similar to FIG. 1 illustrating a modified pilot controlled primary valve including a modified solenoid pilot valve according to this invention for controlling the primary valve;

FIG. 6 is an enlarged axial section through the solenoid pilot valve and adjacent portions of the primary valve in FIG. 5;

FIG. 7 is an enlarged exploded view of the solenoid pilot valve in FIGS. 5 and 6; and FIG. 8 illustrates a further modified solenoid valve.

DESCRIPTION OF THE PREFERRED EMBODIMENT

Referring now to these drawings and first to FIGS. 1-3, there is illustrated an improved solenoid device 10 according to the invention. This solenoid device comprises a solenoid 12 including coil 14 and a pair of electrical leads 16 for connection to an electrical source (not shown) for energizing the coil. The coil 14 and an adjacent portion of the leads 16 are encapsulated in a unitary homogeneous body 18 of solidified plastic material, such as an epoxy.

The plastic body 18 includes first and second body portions 20, 22 of the plastic material which are integrally formed as a one piece homogeneous part. The first body portion 18 encapsulates and is sealed to the coil 14 and is solid in cross-section from its outer surfaces to the coil. This first body portion may have any convenient shape which, in the illustrated solenoid device, is a block-like or generally cube shape having flat parallel faces 24 at opposite ends of and normal to the axis of the coil. According to a feature of the invention, the second body portion 22 comprises an externally threaded male coupling stem which encapsulates and is sealed to the leads 16 throughout a portion of their length from the first body portion to a position spaced from the free ends of the leads. The entire length of the stem is solid in cross-section from its outer threaded surface to the leads. The leads 16 extend axially through the stem and have free end portions extending beyond the outer end of the stem for connection to the electrical source for energizing said coil. As will appear from the following description, the integral coupling stem 22 may be used in different ways.

According to an important feature of the invention, the plastic body 18, including its coil-encapsulating portion 20 and its externally threaded coupling stem 22, is molded in one piece directly about the coil 14 and leads 16. In this regard, it is evident that the block-like shape of the body portion 20 and the male shape of the threaded coupling stem 22 permit such molding of the plastic body 18 in one piece directly about the coil 14 and leads 16.

According to another feature of the invention, the solenoid 12 and its encapsulating plastic body 18 form a replaceable coil part which may be replaced by a new coil part if the solenoid becomes inoperable, and the solenoid device includes a magnetically permeable yoke 25 which is removably mounted on the solenoid body 18 to permit reuse of the yoke on the new coil part. The yoke staddles the body 18 endwise of the solenoid coil 14 and includes arms 25a which extend across the side faces 24 of the plastic body 18. The yoke provides an external magnetic flux path for the solenoid coil.

The illustrated solenoid device 10 is a solenoid actuator having a non-magnetic spool 26 on which the solenoid coil 14 is wound, and a hole 28 extending coaxially through the spool and opening through the body surfaces 24. Removably positioned within this hole is an armature assembly 30. This armature assembly includes an outer non-magnetic armature sleeve 32 and a magnetic armature 34 movable axially in the sleeve. The ends of this sleeve extend beyond the solenoid body surfaces 24 and through holes in the arms 25a of the magnetic yoke 25. The lower end of the sleeve, as it is viewed in the drawings, is radially enlarged and externally threaded to form an externally threaded coupling shoulder 36 on the sleeve. The opposite or upper end of the sleeve is reduced in diameter and externally threaded to receive a nut 38. In the particular solenoid actuator illustrated, the upper end of the sleeve is closed and contains a screwdriver slot 40.

The armature guide sleeve 32 is radially sized to fit slidably in the hole 28 through the solenoid coil 14. The sleeve is sized in length to be receivable within the hole to the position of FIG. 2, wherein the lower threaded sleeve shoulder 36 seats against the lower yoke arm 25a, and the upper threaded end of the sleeve extends above the upper yoke arm 25a to receive the nut 38. The nut is tightened against the upper yoke arm to firmly secure the yoke 25 and armature sleeve 32 to the solenoid body 18.

The solenoid armature 34 comprises a generally cylindrical plunger constructed of magnetic material. Surrounding a reduced lower portion of this plunger is a compression coil spring 42, the lower end of which seats against a circumferential shoulder 44 at the lower end of the plunger. The upper end of the spring seats against a downwardly facing shoulder 46 within the sleeve 32. Spring 42 urges the magnetic armature 34 downwardly in the armature sleeve. Energization of the coil creates a magnetic field which retracts the armature upwardly in the sleeve. The plunger has longitudinal grooves in its outer surface through which fluid may pass from one end of the plunger to the other during axial movement of the plunger in the armature sleeve.

This movement of the armature may be utilized to perform various functions. The particular solenoid actuator 10 illustrated in FIGS. 1-4 is a solenoid valve acutator in which the armature movement effects a fluid controlling function. More specifically, the illustrated solenoid valve actuator 10 is a pilot valve for controlling a primary pilot controlled valve 48. This primary valve is conventional and thus need not be described in elaborate detail. Suffice it to say that the valve 48 includes a body 50 having a fluid inlet 52 and outlet 54 connected by a main flow passage 56 through the valve. Between the inlet and outlet is a valve diaphram 58 engagable with a valve seat 60 to control flow through the valve. One side of the valve is exposed to fluid pressure in the valve passage 56. The opposite side of the valve diaphram is exposed to fluid pressure in a chamber 62 which communicates to the main flow passage 56 at the upstream side of the valve seat 60. The chamber 62 communicates to the flow passage at the downstream side of the valve seat 60 through a pilot passage 66 controlled by the improved solenoid pilot valve 10 of this invention.

As shown best in FIG. 2, the lower externally threaded coupling shoulder 36 on the armature sleeve 32 of the solenoid pilot valve is threaded into a socket 68 in the primary valve body 50 to firmly secure the sleeve to the valve body. The sleeve may be rotated to thread the sleeve into the socket by a screwdriver whose blade is inserted into the screwdriver slot 40 in the upper end of the sleeve. Fixed in the bottom of the socket 68 is a pilot valve seat 70. The pilot passage 66 extends from the diaphram chamber 62 of the primary valve 48 into the socket 68 and then through the valve seat 70 to the primary valve flow passage 56 downstream of the primary valve seat 60. The magnetic armature 34 of the solenoid pilot valve 10 comprises a pilot valve member having a seating face 74 engagable with the pilot valve seat 70. The solenoid pilot valve is connected to an electrical source through an electrical cable 76 having a coupling 78 threaded on the integral solenoid valve coupling stem 22.

When the solenoid coil 14 is deenergized, the pilot valve spring 42 holds the seating face 74 of the armature valve member 34 against its seat 70 to block flow from the diaphram chamber 62 through the pilot passage 66 and thereby effect closing of the valve diaphram 58 to block flow through the primary pilot controlled valve 48. Energizing of the solenoid coil 14 retracts the armature valve member 34 from its valve seat 70 to open the pilot passage 66 for flow from the diaphram chamber 62 and thereby effect opening of the valve diaphram 58 to permit flow through the primary valve 48.

A unique advantage of the solenoid pilot valve 10 resides in the fact that if its solenoid 12 becomes inoperable, the solenoid may be replaced by a new solenoid without replacing the solenoid yoke 25 or armature assembly 30. This is accomplished by removing the retaining nut 38 from the upper end of the armature sleeve 32, removing the replaceable solenoid part (plastic body 18 and the encapsulated solenoid 12) and the yoke 25 from the armature sleeve, and removing the yoke and armature assembly from the replaceable part for use on the new part.

FIGS. 4, 4A illustrate a solenoid valve 100 including an improved solenoid valve actuator 10, identical to that described above, threadedly coupled to a valve body 102. This valve body contains a fluid passage 104 surrounded by a valve seat 106 engagable by the armature valve member 34 of the solenoid actuator 10. As in FIGS. 1-3, the armature valve member 34 is urged against the valve seat 106 by the armature spring 42 to close the valve and is retracted from the valve seat 106 to open the valve when the actuator solenoid (not shown in FIG. 4) is energized.

In FIG. 4, the solenoid valve is mounted on a wall 108 by inserting the solenoid mounting stem 22 through a hole in the wall from one side of the wall and threading a nut 110 on the stem at the opposite side of the wall. Wall 108 may be a barrier wall between a hostile envionment at the left side of the wall in FIG. 4 in which the solenoid actuator may safely operate because of its encapsulated construction, and a safe environment, such as a normal atmospheric environment, at the right side of the wall from which electrical parts and need not be shielded. In this case, a seal ring 112 may be placed between the actuator and the wall to seal the hole through the wall.

FIGS. 5-7 illustrate a modified solenoid pilot valve 10a according to the invention mounted on a modified pilot controlled primary valve 48a. The modified primary pilot controlled valve 48a is identical to the valve 48 of FIG. 1 with the following exception. The portion of the internal pilot passage 66 through which fluid flows from the diaphram chamber 62 to the solenoid pilot valve 10 in FIG. 1 is replaced, in FIG. 5, by an external tube 78a. The modified solenoid pilot valve 10a in FIGS. 5-7 is identical to the solenoid pilot valve 10 of FIGS. 1-4 with the following exception. The armature sleeve 32a of the modified valve is secured to the plastic solenoid body 18a by a friction push washer 38a rather than a nut and contains an axial passage 80a which opens upwardly through the upper end of the sleeve and downwardly to the armature valve member 34a. The pilot passage tube 78a connects to the upper end of the armature sleeve 32a.

The pilot controlled primary valve 48a and solenoid pilot valve 10a operate in the same manner as explained in connection with FIGS. 1-3, except that when the pilot valve 48a is open, fluid flow from the diaphram chamber of the primary valve to effect opening of the valve diaphram occurs through the pilot passage tube 78a, then downwardly through the armature sleeve passage 80a and the grooves in the armature valve member 34a of the solenoid pilot valve, and finally through the pilot valve seat 60a to the downstream end of the primary valve flow passage. Closure of the solenoid pilot valve similarly effects closure of the primary valve, as in FIGS. 1-3.

The wall mounted valve assembly 100 of FIG. 8 is identical to that of FIG. 4 except that the solenoid actuator of the valve assembly is the modified solenoid actuator 10a just described.

We claim:

1. A solenoid device comprising:
   a solenoid including a coil and a pair of electrical leads connected to said coil and having free ends,
   a unitary homogeneous body of solidified plastic material including a first body portion of said plastic material encapsulating and sealed to said coil and a second body portion of said plastic material integral with said first body portion and encapsulating and sealed to said leads between said first body portion and a position spaced from said free ends of the leads, and wherein
   said second body portion comprises an externally threaded mounting stem having an outer end, and
   said leads extend axially through and beyond said outer end of said stem and have free end portions extending beyond said outer end of the stem for connection to an electrical energy source for energizing said coil.

2. A solenoid device according to claim 1 wherein:
   said body comprises a molded plastic part which is molded in one piece directly about said coil and leads.

3. A solenoid device according to claim 1 wherein:
   said coil has opposite ends and a longitudinal axis, and
   said stem has a longitudinal axis transverse to said coil axis.

4. A solenoid device according to claim 1 wherein:
   said coil has opposite ends and a longitudinal axis, and
   said stem has a longitudinal axis transverse to and intersecting said coil axis between said coil ends.

5. A solenoid device according to claim 1 wherein:
   said coil has opposite ends,
   said first body portion has external sides at said coil ends, respectively, and
   said device includes a generally U-shaped magnetic yoke removably straddling said first body portion endwise of said coil and having yoke arms at said external sides of said first body portion.

6. A solenoid device according to claim 1 wherein:
   said device is a solenoid actuator having a hole extending axially through said coil and opening at one end to the exterior of said first body portion, and
   said actuator includes a magnetic armature accessible at said one end of said hole and movable axially of said hole in response to energizing of said coil.

7. A solenoid device according to claim 1 wherein:
   said device is a solenoid actuator having a hole extending axially through said coil and opening at one end to the exterior of said first body portion, and
   said actuator includes a core assembly comprising a sleeve extending axially through said hole and having an open end at said one end of the hole, and a magnetic armature in and accessible at said open end of said sleeve and movable axially in said sleeve in response to energizing of said coil.

8. A solenoid device according to claim 1 wherein:
   said device is a solenoid actuator having a hole extending axially through said coil and opening at one end through one side of said first body portion, and
   said actuator includes a core assembly comprising a sleeve within said hole and having an open, externally enlarged and threaded end located at said one end of the hole and beyond said side of said first body portion, and a magnetic armature in and accessible at said open end of said sleeve and movable axially in said sleeve in response to energizing of said coil.

9. A solenoid device according to claim 1 wherein:
   said device is a solenoid actuator having a hole extending axially through said coil and opening at its ends through opposite sides of said first body portion,
   said actuator includes a removable core assembly within said hole comprising a sleeve extending axially through said hole and having an open, externally enlarged and threaded end located at one end of said hole and beyond the adjacent side of said first body portion, and a magnetic armature in and accessible at said open end of said sleeve and movable axially in said sleeve in response to energizing of said coil,
   said body and the encapsulated coil and leads constitute a replaceable coil unit which is removable from said sleeve for replacement by another coil unit, and
   said device includes means releasibly securing said replaceable coil unit to said sleeve.

10. A solenoid device according to claim 1 wherein:
    said device is a solenoid valve having a hole extending axially through said coil and opening at one end through one side of said first body portion, and
    said valve includes a core assembly comprising a sleeve within said hole and having an open, externally enlarged and threaded end located at said one end of the hole and beyond said side of said first body portion, and a magnetic valve member in and accessible at said open end of said sleeve and movable axially in said sleeve in response to energizing of said coil.

11. A solenoid device according to claim 1 wherein:
    said device is a solenoid valve having a hole extending axially through said coil and opening at its ends through opposite sides of said first body portion,
    said valve includes a removable core assembly within said hole comprising a sleeve extending axially through said hole and having an open, externally enlarged and threaded end located at one end of said hole and beyond the adjacent side of said first body portion, and a magnetic valve member in and accessible at said open end of said sleeve and movable axially in said sleeve in response to energizing of said coil,
    said body and encapsulated coil and leads form a replaceable coil unit which is removable from said sleeve for replacement by a new coil unit, and
    said device includes means releasibly securing said replaceable coil unit to said sleeve.

12. A solenoid device according to claim 1 wherein:
    said coil has opposite ends,
    said first body portion has external sides at said coil ends and a hole extending axially through said coil and opening at its ends through said external sides,
    said device is a solenoid actuator including a generally U-shaped magnetic yoke removably straddling said first body portion endwise of said coil and including yoke arms at said external sides of said first body portion having openings aligned with said hole, and a removable core assembly within said hole comprising a sleeve extending axially through said hole and yoke arm openings and having an open, externally enlarged and threaded end located at one end of said hole and beyond the adjacent yoke arm, and a magnetic armature in and accessible at said open end of said sleeve and movable axially in said sleeve in response to energizing of said coil, said body and the encapsulated coil and leads constitute a replaceable coil unit which is removable from said sleeve for replacement by a new coil unit, said device includes means releasibly securing said replaceable coil unit to said sleeve, and said yoke is removable from said replaceable coil unit for use on the new coil unit.

13. A solenoid device according to claim 1 wherein:

said coil has opposite ends, said first body portion has external sides at said coil ends and a hole extending axially through said coil and opening at its ends through said external sides, said device is a solenoid valve including a generally U-shaped magnetic yoke removably straddling said first body portion endwise of said coil and including yoke arms at said external sides of said first body portion having openings aligned with said hole, and a removable core assembly within said hole comprising a sleeve extending axially through said hole and yoke arm openings and having an open, externally enlarged and threaded end located at one end of the sleeve beyond the adjacent yoke arm, and a magnetic valve member in and accessible at said open end of said sleeve and movable axially in said sleeve in response to energizing of said coil, said body and the encapsulated coil and leads constitute a replaceable coil unit which is removable from said sleeve for replacement by a new coil unit, said device includes means releasibly securing said replaceable coil unit to said sleeve, and said yoke is removable from said replaceable coil unit for use on the new coil unit.

14. A solenoid device according to claim 12 wherein:

said body comprises a unitary molded plastic part which is molded in one piece directly about said coil and leads.

15. A solenoid device according to claim 13 wherein:

said body comprises a unitary molded plastic part which is molded in one piece directly about said coil and leads.

* * * * *